(12) United States Patent
Fujimoto et al.

(10) Patent No.: US 11,761,544 B2
(45) Date of Patent: Sep. 19, 2023

(54) FLOW CONTROL VALVE

(71) Applicant: PACIFIC INDUSTRIAL CO., LTD., Ogaki (JP)

(72) Inventors: Satoshi Fujimoto, Anpachi-gun (JP); Terumasa Mitsu, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 0 days.

(21) Appl. No.: 17/582,521

(22) Filed: Jan. 24, 2022

(65) Prior Publication Data

US 2022/0252160 A1    Aug. 11, 2022

(30) Foreign Application Priority Data

Feb. 5, 2021  (JP) .................................. 2021-017330

(51) Int. Cl.
    *F16K 1/36*    (2006.01)
(52) U.S. Cl.
    CPC ...................... *F16K 1/36* (2013.01)
(58) Field of Classification Search
    CPC .................... F16K 1/36; F16K 1/385
    See application file for complete search history.

(56) References Cited

U.S. PATENT DOCUMENTS 3,703,273 A * 11/1972 Illing ...................... F16K 47/04
                                                138/46
2017/0002931 A1    1/2017 Shu et al.

FOREIGN PATENT DOCUMENTS

| JP | H08-170753 A | 7/1996 | |
|---|---|---|---|
| JP | 2008-138971 A | 6/2008 | |
| JP | 2014-142136 A | 8/2014 | |
| JP | 2015-017663 A | 1/2015 | |
| WO | WO-2014204329 A1 * | 12/2014 | ............. F16K 1/385 |

OTHER PUBLICATIONS

Jun. 9, 2022 Search Report issued in European Patent Application No. 22153477.9.
Jun. 22, 2022 Office Action issued in European Patent Application No. 22153477.9.

* cited by examiner

*Primary Examiner* — Kelsey E Cary
(74) *Attorney, Agent, or Firm* — Oliff PLC (57) ABSTRACT

A flow control valve in which a needle-shaped valve element is fitted into a valve hole provided in a partition wall partitioning a flow path at an intermediate portion, and the valve element moves in an axial direction of the valve element to control a flow rate of a fluid passing between an outer side surface of the valve element and an inner side surface of the valve hole, the flow control valve includes: a tapered inner side surface that is included in the inner side surface of the valve hole; and a tapered outer side surface that is included in the outer side surface of the valve element, faces the tapered inner side surface from inside, and is inclined along the tapered inner side surface.

11 Claims, 8 Drawing Sheets

FLOW CONTROL VALVE

BACKGROUND OF THE INVENTION

(1) Field of the Invention

The present disclosure relates to a flow control valve that is provided in a flow path and controls a flow rate of a fluid.

(2) Description of Related Art

Conventionally, as this type of flow control valve, there has been known a valve that moves a valve element in an axial direction thereof to control a flow rate of a fluid passing between an outer side surface of the valve element and an inner side surface of a valve hole (see, for example, JP H8-170753 A (FIG. 3 and the like)).

SUMMARY OF THE INVENTION

In the conventional flow control valve described above, when the valve element vibrates in a radial direction in a state where the outer side surface of the valve element and the inner side surface of the valve hole face each other, one or both of the outer side surface of the valve element and the inner side surface of the valve hole are worn, and a problem may occur in flow control.

The present disclosure provides a flow control valve in which a needle-shaped valve element is fitted into a valve hole provided in a partition wall partitioning a flow path at an intermediate portion, and the valve element moves in an axial direction of the valve element to control a flow rate of a fluid passing between an outer side surface of the valve element and an inner side surface of the valve hole, the flow control valve including: a tapered inner side surface that is included in the inner side surface of the valve hole; and a tapered outer side surface that is included in the outer side surface of the valve element, faces the tapered inner side surface from inside, and is inclined along the tapered inner side surface.

DETAILED DESCRIPTION OF PREFERRED EMBODIMENTS

Figure 1:
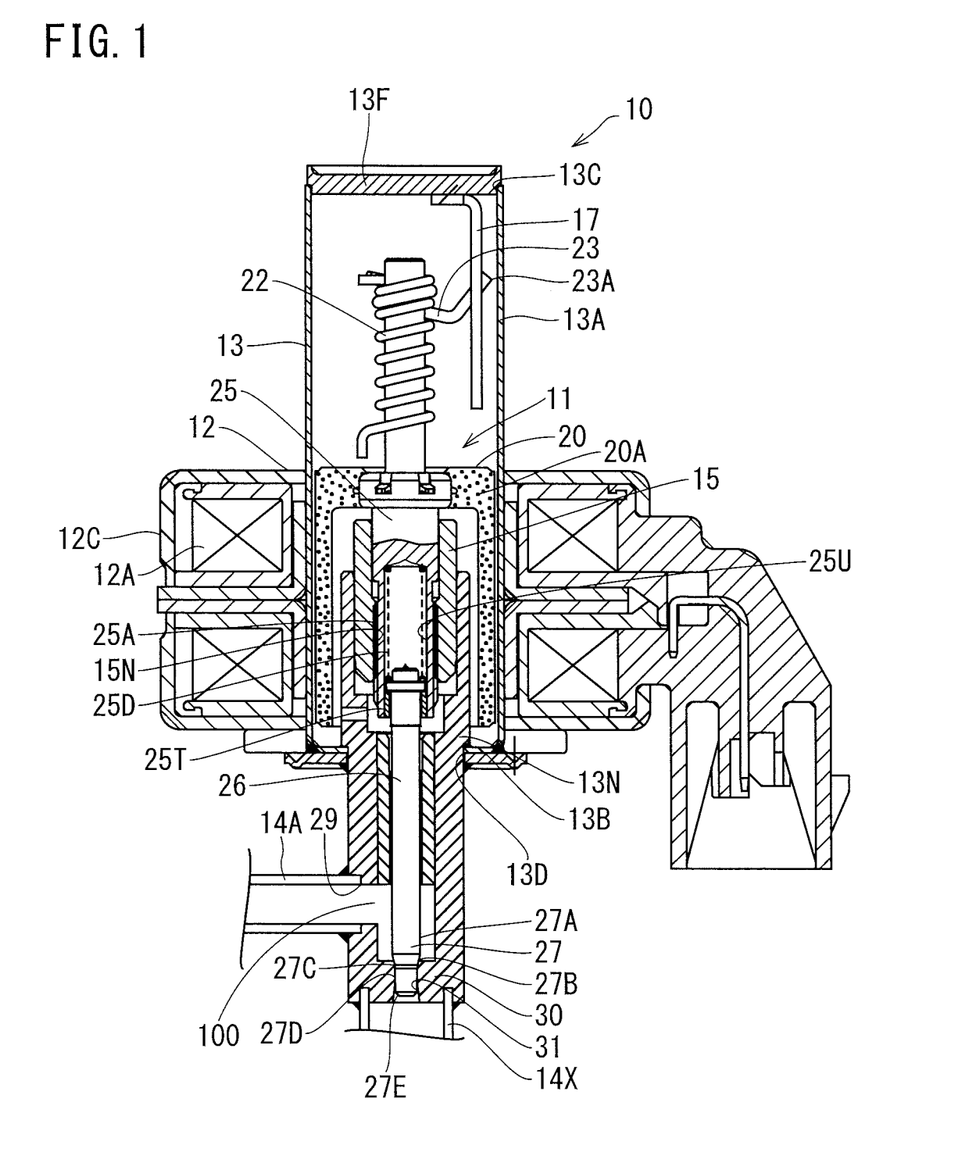
FIG. 1 is a sectional view of a flow control valve according to the present disclosure.

Hereinafter, a flow control valve 10 of the present disclosure will be described with reference to FIGS. 1 to 8. The flow control valve 10 illustrated in FIG. 1 is a so-called "electric expansion valve", in which a motor 11 (stepping motor) drives a shaft member 25 having a valve element 27. Hereinafter, for convenience sake, the vertical direction in FIG. 1 is defined as the vertical direction of the flow control valve 10 and components thereof, but the flow control valve 10 may be used in any posture.

The motor 11 includes a stator 12 and a rotor 20. The stator 12 is constituted by an annular case 12C that houses a plurality of electromagnetic coils 12A and is attached to a middle portion of a valve body 13 having a substantially cylindrical shape. The valve body 13 includes a cylindrical case 13A closed at one end and an inner cylinder portion 13N extending through a through hole 13D formed in a bottom wall 13B of the cylindrical case 13A. An upper end opening 13C of the cylindrical case 13A is closed by a lid body 13F. The annular case 12C is disposed at a lower end portion of the cylindrical case 13A. The cylindrical case 13A may have a configuration in which both ends are opened and a space between the cylindrical case 13A and the inner cylinder portion 13N is closed by another member.

An extension pipe 15 is press-fitted inside an upper portion of the inner cylinder portion 13N. A female screw portion 15N is formed on an inner surface of a lower portion of the extension pipe 15.

A partition wall 30 in which a valve hole 31 is formed is provided at a lower end portion of the inner cylinder portion 13N. A through hole 29 passing through a side wall is formed at a position closer to the partition wall 30 in the inner cylinder portion 13N, and a first connecting pipe 14A is attached to the through hole 29. A second connecting pipe 14X extending downward is attached to a lower surface of the partition wall 30. As a result, a fluid can flow from the second connecting pipe 14X to the first connecting pipe 14A (or in the opposite direction) through the valve hole 31 of the partition wall 30. That is, the partition wall 30 partitions the flow path 100 from the second connecting pipe 14X to the first connecting pipe 14A at an intermediate portion.

As illustrated in FIG. 1, the rotor 20 includes a permanent magnet 20A having a cylindrical shape closed at its upper end and the shaft member 25 that is inserted through and fixed in an upper end wall of the permanent magnet 20A, and is rotatably housed inside the cylindrical case 13A. A valve element housing chamber 25U opened downward is formed below a portion fixed to the permanent magnet 20A in the shaft member 25. The valve element housing chamber 25U houses a proximal end portion of a needle-shaped valve element member 26 extending in an axial direction of the inner cylinder portion 13N and a compression coil spring 25D disposed on the deeper side of the proximal end portion of the valve element member 26, and a tubular valve element retaining member 25T is fixed to an opening side end portion of the valve element housing chamber 25U. The proximal end portion of the valve element member 26 protrudes laterally beyond the inner diameter of the valve element retaining member 25T. The valve element member 26 is biased downward by the compression coil spring 25D and pressed against the valve element retaining member 25T. A lower end portion (distal end portion) of the valve element member 26 serves as the valve element 27.

A male screw portion 25A is formed in a lower portion of an outer side surface of the shaft member 25, and the male screw portion 25A is screwed into the female screw portion 15N of the extension pipe 15. As a result, when the shaft member 25 rotates together with the permanent magnet 20A (that is, the rotor 20 rotates), the shaft member 25 (that is, the rotor 20) moves in the vertical direction, and the valve element 27 opens and closes the valve hole 31 (see FIGS. 2 and 3). The valve element member 26 may rotate together with the shaft member 25, or may be configured not to rotate with respect to the valve body 13. For example, part of the valve element member 26 may have a non-circular cross section, and a non-circular through hole corresponding to the non-circular cross section may be formed in the valve body 13.

A spiral guide 22 is fixed above the portion fixed to the permanent magnet 20A in the shaft member 25. The spiral guide 22 is constituted by a wire rod spirally wound around an upper end portion of the shaft member 25. The upper end portion of the shaft member 25 is slit and a straight portion of the wire rod is inserted into the slit and fixed by caulking, and thus the spiral guide 22 is fixed to the shaft member 25. Alternatively, it is possible to fix the spiral guide 22 by laterally passing an upper end portion of the wire rod through the upper end portion of the shaft member 25.

The spiral guide 22 is engaged with a slider 23. The slider 23 has a ring shape that fits in one of gaps between axially adjacent portions of the wire rod of the spiral guide 22, and is provided with a slider arm 23A protruding laterally. A stopper 17 hangs down in parallel with the shaft member 25 from the lid body 13F that closes the upper end opening 13C of the cylindrical case 13A. When the rotor 20 rotates in a state where the slider arm 23A abuts on the slider 23, the slider 23 rotates relative to the spiral guide 22 and moves up and down. When the slider 23 has moved to an upper end portion or a lower end portion of the spiral guide 22, the slider 23 becomes unable to rotate. As a result, the amount of rotation of the rotor 20 (that is, the amount of linear movement of the valve element 27) is restricted.

Figure 2:
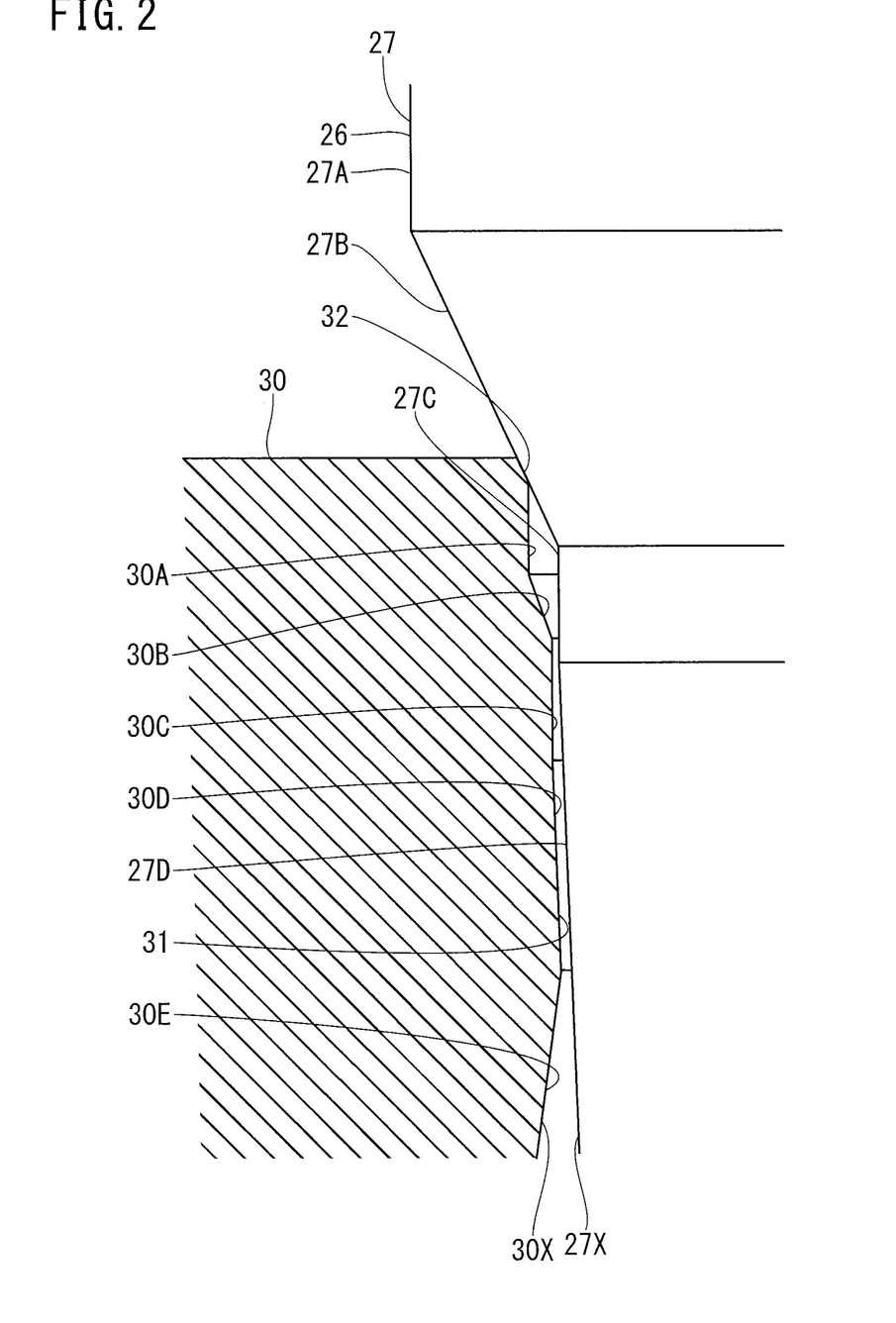
FIG. 2 is a sectional view of the vicinity of a valve element.
Figure 3:
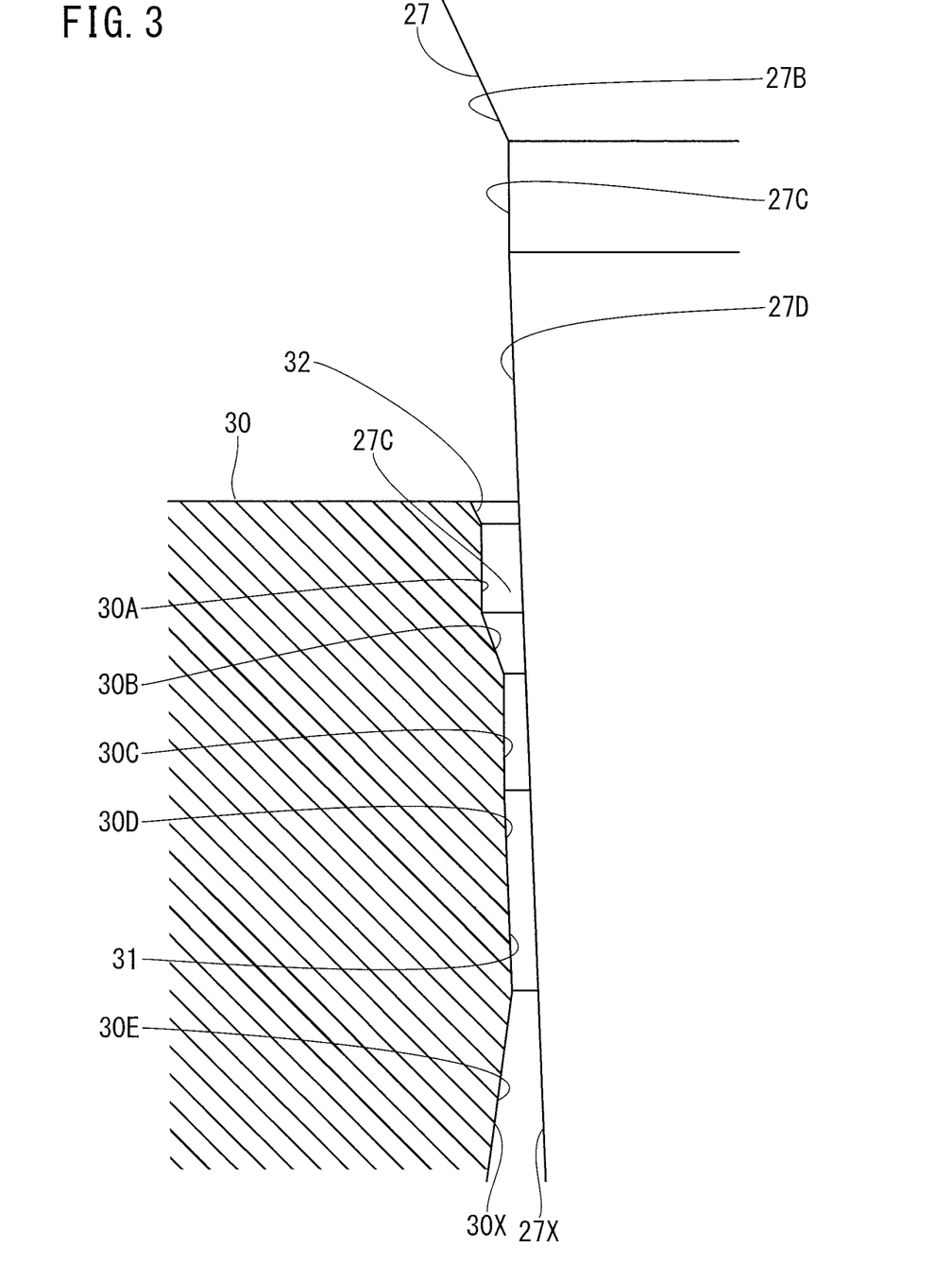
FIG. 3 is a sectional view of the vicinity of the valve element.

The flow control valve 10 is incorporated in, for example, the flow path 100 for refrigerant of a car air conditioner, and controls the flow rate of the refrigerant between the first connecting pipe 14A and the second connecting pipe 14X. Specifically, as illustrated in FIG. 1, in a state where the slider 23 is restricted from rotating at the upper end portion of the spiral guide 22, as illustrated in FIG. 2, the valve element 27 of the valve element member 26 enters the valve hole 31 of the partition wall 30 and abuts on a valve seat 32, thereby closing the valve hole 31 to restrict the flow between the first connecting pipe 14A and the second connecting pipe 14X. Then, as illustrated in FIG. 3, the valve element 27 moves upward to open the valve hole 31, thereby enabling the flow between the first connecting pipe 14A and the second connecting pipe 14X.

Hereinafter, the valve element 27 and the valve hole 31 will be described. As illustrated in FIGS. 1 and 2, an outer side surface 27X of the valve element 27 includes, in order from the top, a shaft portion 27A, a first needle tapered portion 27B (corresponding to an "abutting portion" in the claims), a needle straight portion 27C (corresponding to a "cylindrical outer side surface" in the claims), a second needle tapered portion 27D (corresponding to a "tapered outer side surface" in the claims), and a third needle tapered portion 27E. The shaft portion 27A has a cylindrical surface having a constant outer diameter larger than the minimum inner diameter of the valve hole 31. The first needle tapered portion 27B extends from a lower end of the shaft portion 27A with a gradual reduction in diameter. The needle straight portion 27C hangs down from a lower end of the first needle tapered portion 27B, and has an axial length of about ⅓ to ⅕ of the axial length of the first needle tapered portion 27B. The second needle tapered portion 27D extends from a lower end of the needle straight portion 27C with a gradual reduction in diameter, and has an axial length of about 2 to 5 times the axial length of the first needle tapered portion 27B.

The first needle tapered portion 27B and the second needle tapered portion 27D have different taper angles, and the second needle tapered portion 27D has a smaller taper angle than the first needle tapered portion 27B. For example, the first needle tapered portion 27B has a taper angle (included angle of taper) of 40 to 60 degrees, while the second needle tapered portion 27D has a taper angle (included angle of taper) of 1 to 10 degrees.

The third needle tapered portion 27E is gradually reduced in diameter from a lower end of the second needle tapered portion 27D at an angle larger than the taper angle of the first needle tapered portion 27B, and has an axial length substantially equal to the axial length of the needle straight portion 27C.

Figure 4:
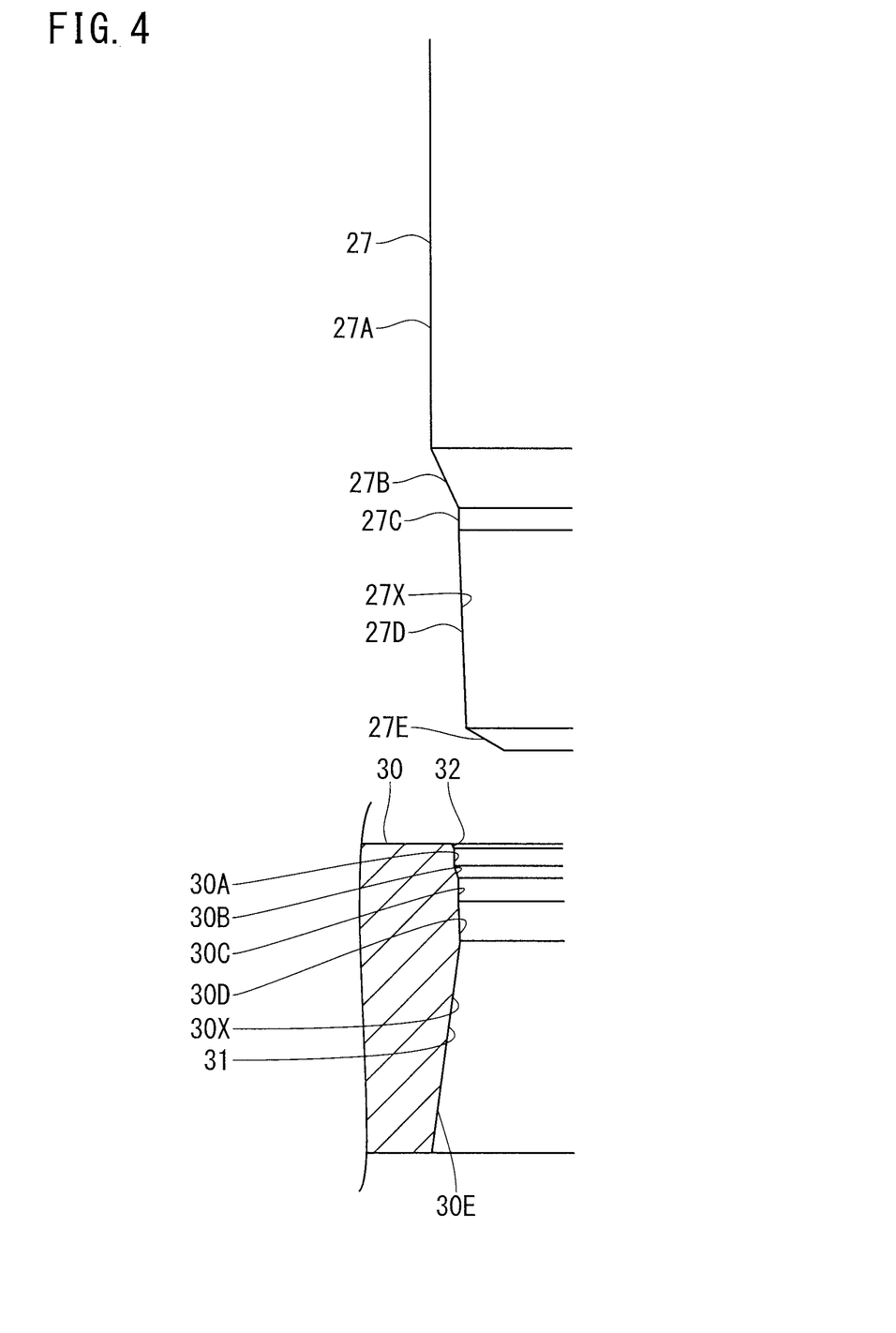
FIG. 4 is a sectional view of the vicinity of the valve element.

As illustrated in FIGS. 2 to 4, the valve hole 31 passes through the partition wall 30, and an upper end portion of an inner side surface of the partition wall 30 serves as the valve seat 32 (corresponding to an "abutting portion" in the claims). The valve seat 32 is inclined, corresponding to the first needle tapered portion 27B, at an angle that is the same as that of the first needle tapered portion 27B or slightly larger than that of the first needle tapered portion 27B (by a difference of less than 10 degrees). The first needle tapered portion 27B of the valve element 27 comes into contact with or separates from the valve seat 32 to close or open the valve hole 31.

An inner side surface 30X of the partition wall 30 (the inner side surface 30X of the valve hole 31) includes, below the valve seat 32, an upper straight portion 30A, an upper tapered portion 30B, a flow control straight portion 30C (corresponding to a "cylindrical inner side surface" in the claims), a facing tapered portion 30D (corresponding to a "tapered inner side surface" in the claims), and a lower tapered portion 30E. The upper tapered portion 30B extends from a lower end of the upper straight portion 30A with a gradual reduction in diameter. The flow control straight portion 30C hangs downward from a lower end of the upper tapered portion 30B. The facing tapered portion 30D is gradually reduced in diameter from a lower end of the flow control straight portion 30C, and is inclined along the second needle tapered portion 27D. For example, the taper angle (included angle of taper) of the facing tapered portion 30D is the same as that of the second needle tapered portion 27D, or slightly smaller than that of the second needle tapered portion 27D (by a difference of less than 1.0 degrees, or more desirably less than 0.5 degrees). The axial length of the facing tapered portion 30D is, for example, about 1.2 to 2 times the axial length of the flow control straight portion 30C.

The axial length of the flow control straight portion 30C is larger than the axial length of the needle straight portion 27C of the valve element 27 (about 1.2 times in the present embodiment), and the axial length of the facing tapered portion 30D is smaller than the axial length of the second needle tapered portion 27D of the valve element 27 (about ¼ to ⅕ times in the present embodiment).

The lower tapered portion 30E extends from a lower end of the facing tapered portion 30D while expanding in diameter. The axial length of the lower tapered portion 30E is about 4 to 5 times the axial length of the facing tapered portion 30D.

As illustrated in FIG. 2, when the valve is closed, the first needle tapered portion 27B of the valve element 27 abuts on the valve seat 32 to close the valve hole 31. At this time, a lower portion of the needle straight portion 27C of the valve element 27 faces an upper end portion of the flow control straight portion 30C of the valve hole 31 with a gap therebetween, and an upper portion of the second needle tapered portion 27D of the valve element 27 faces the flow control straight portion 30C and the facing tapered portion 30D of the valve hole 31 with a gap therebetween.

Figure 5:
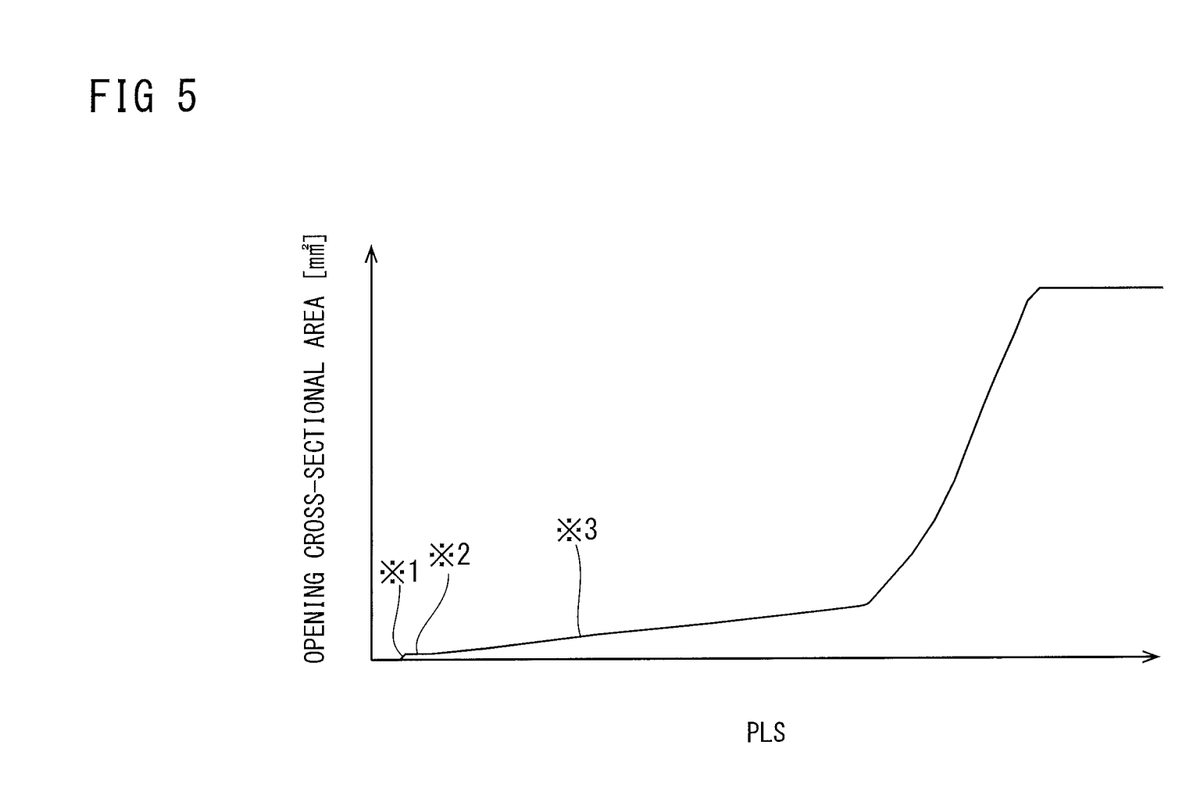
FIG. 5 is a graph illustrating a relationship between the number of input pulses (PLS) and an opening cross-sectional area.
Figure 6:
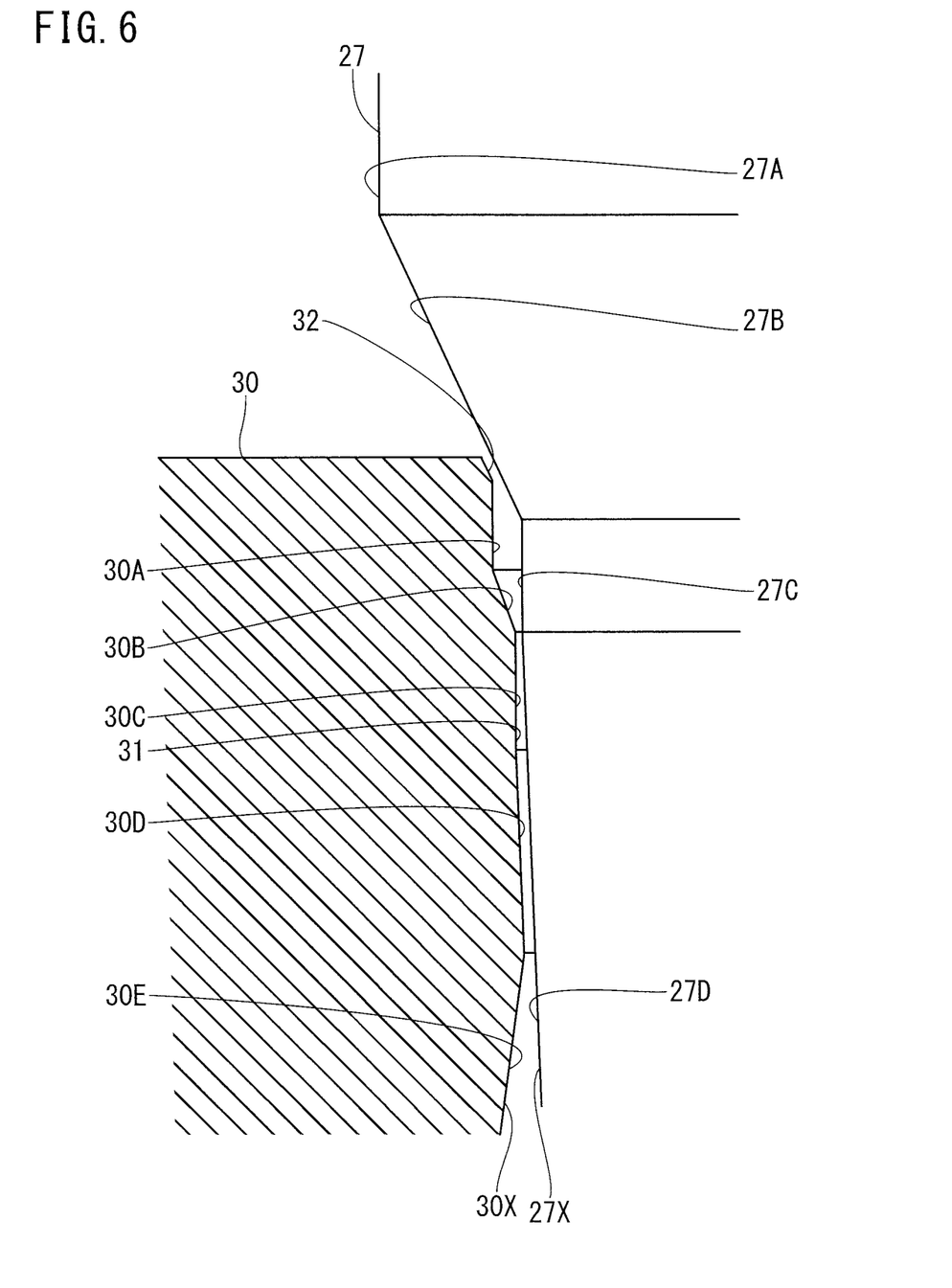
FIG. 6 is a sectional view of the vicinity of the valve element.
Figure 7:
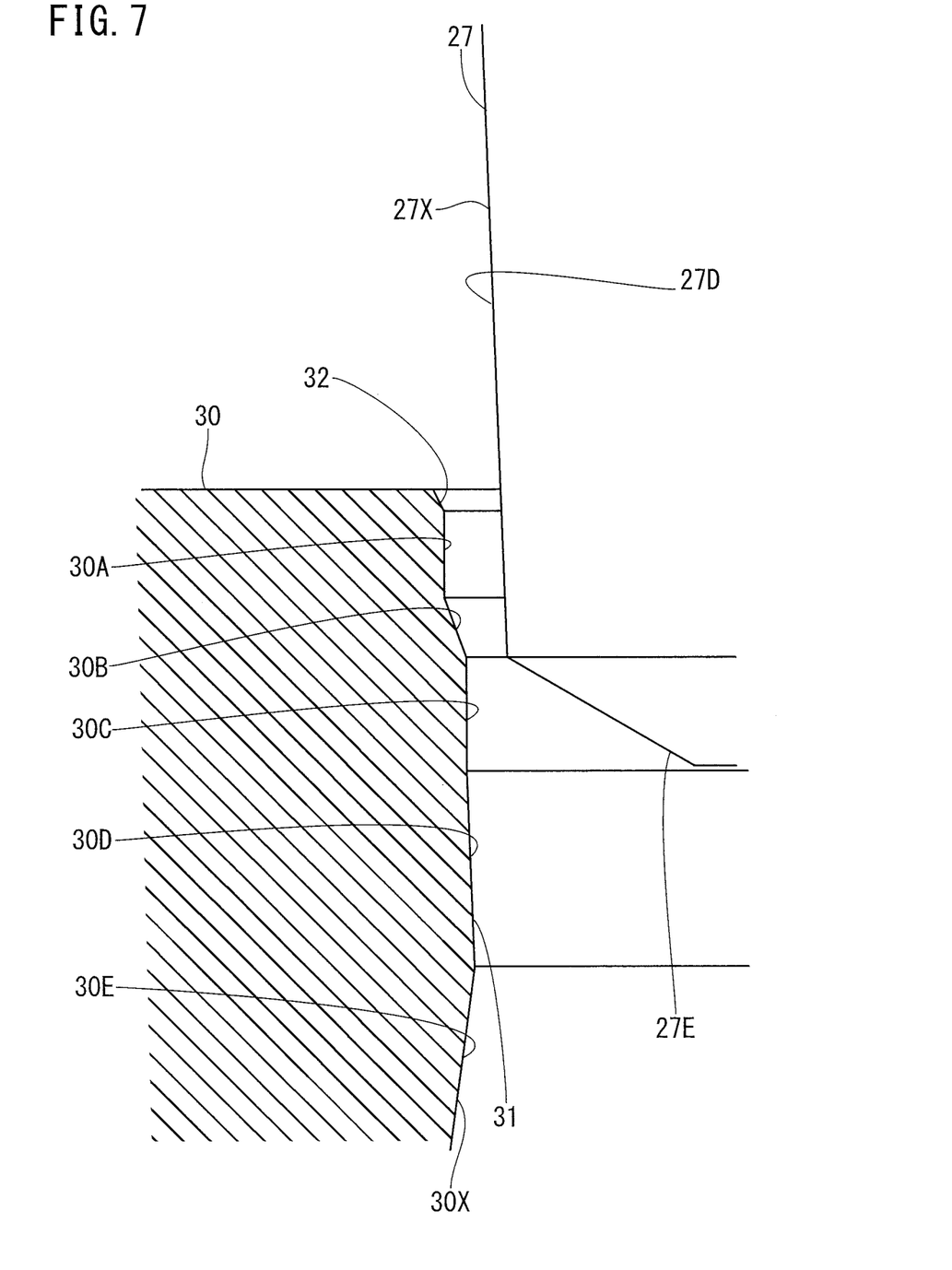
FIG. 7 is a sectional view of the vicinity of the valve element.

FIG. 5 illustrates a change in the opening cross-sectional area from a fully closed state (see FIG. 2) to a fully open state (see FIG. 4) of the flow control valve 10. A horizontal axis of a graph in FIG. 5 represents a linear movement position (valve opening degree) of the valve element 27 by the number of input pulses of the motor 11 (stepping motor). In this graph, when the number of input pulses is "0", a distal end portion of the valve element 27 is at a position where the distal end portion has entered most deeply into the valve hole 31 (at the minimum valve opening degree), and as the number of input pulses increases, the distal end portion of the valve element 27 retracts from the valve hole 31. The opening cross-sectional area refers to the cross-sectional area of the smallest gap between the valve hole 31 and the valve element 27, and the flow rate of the fluid changes in accordance with the change in the opening cross-sectional area. In the present embodiment, the valve element 27 moves a distance of 0.5 to 20 [μm] for a working angle of one step of the motor 11, and thus the position of the valve element 27 can be finely controlled.

First, the valve is opened from the fully closed state (see FIG. 2), and the opening cross-sectional area gradually increases as the gap between the valve seat 32 and the first needle tapered portion 27B of the valve element 27 increases (*1 in FIG. 5). When the cross-sectional area of the gap between the valve seat 32 and the first needle tapered portion 27B of the valve element 27 exceeds the cross-sectional area of the gap between the needle straight portion 27C of the valve element 27 and the flow control straight portion 30C of the valve hole 31, the opening cross-sectional area remains constant until the needle straight portion 27C passes by the flow control straight portion 30C (see FIG. 6) (*2 in FIG. 5).

Then, after the needle straight portion 27C has passed by the flow control straight portion 30C, the gap between the second needle tapered portion 27D of the valve element 27 and the flow control straight portion 30C gradually increases (see FIG. 3), and the opening cross-sectional area gradually increases again (*3 in FIG. 5). The change in the opening cross-sectional area of this portion enables flow control in a small flow rate region. Where a distance the valve element 27 moves in this section is expressed by L1, and a displacement in shortest distance between the second needle tapered portion 27D and the flow control straight portion 30C is expressed by L2, 0<L2/L1<0.18 is satisfied. Thus, the opening cross-sectional area can be finely controlled by reducing the taper angle of the second needle tapered portion 27D.

Figure 8:
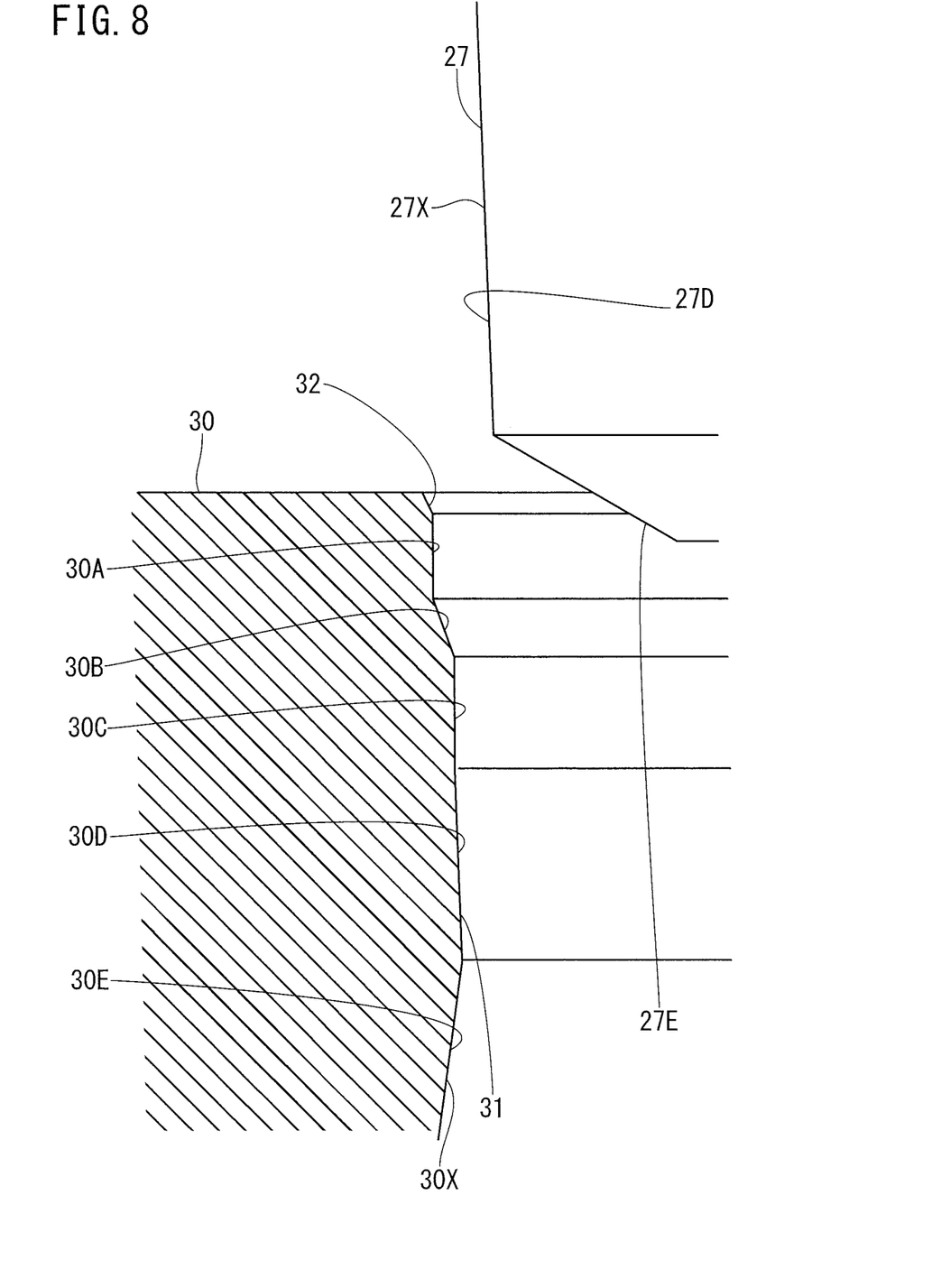
FIG. 8 is a sectional view of the vicinity of the valve element.

After the second needle tapered portion 27D has passed by the flow control straight portion 30C (see FIG. 7), the cross-sectional area of the gap between the lower end of the second needle tapered portion 27D and the upper tapered portion 30B, the upper straight portion 30A, and the valve seat 32 of the valve hole 31 becomes the opening cross-sectional area, and thereafter, the area between an upper end of the valve seat 32 and the third needle tapered portion 27E of the valve element 27 becomes the opening cross-sectional area (see FIG. 8). Then, the entire valve element 27 comes out of the valve hole 31, and the flow control valve 10 is fully opened (see FIG. 4).

In the conventional flow control valve, for example, when the valve element vibrates in a radial direction due to eccentric rotation of the rotor or the like, the valve element or the valve hole may be worn. In particular, as in a boundary portion between the flow control straight portion 30C and the upper tapered portion 30B of the flow control valve 10 of the present embodiment, when the valve element 27 comes into line contact with a portion in which the portion forming the opening cross-sectional area has an edge in the small flow rate region, and causes the edge to be worn, a problem may occur in the flow control in the small flow rate region.

To cope with this problem, according to the flow control valve 10 of the present embodiment, the facing tapered portion 30D facing the second needle tapered portion 27D of the valve element 27 substantially in parallel is provided on the inner side surface of the valve hole 31. Thus, when the valve element 27 vibrates in the radial direction, the valve element 27 (second needle tapered portion 27D) comes into surface contact with the facing tapered portion 30D of the valve hole 31. As a result, the valve element 27 or the valve hole 31 is less likely to be worn. In particular, line contact with the edge of the valve hole 31 is suppressed, and the edge is less likely to be worn.

In addition, in a case of a configuration in which the facing tapered portion 30D of the valve hole 31 and the second needle tapered portion 27D of the valve element 27 having substantially the same taper angle abut on each other to bring the valve into a closed state, there is a concern about biting of the valve element 27 into the valve hole 31. However, the configuration includes the first needle tapered portion 27B that abuts on the valve seat 32 separately from the second needle tapered portion 27D forming an opening cross-sectional area in the small flow rate region, and there is always a clearance between the facing tapered portion 30D and the second needle tapered portion 27D. It is therefore possible to maintain sealing performance when the valve is closed while avoiding biting of the valve element 27.

In addition, the valve element 27 and the valve hole 31 are provided with the needle straight portion 27C and the flow control straight portion 30C, so that the opening cross-sectional area is less likely to change even when the valve element 27 slightly vibrates in the axial direction or the radial direction, and it is possible to reduce variation in the flow rate in the small flow rate region.

In a case where the range in which the inner side surface of the valve hole 31 faces the second needle tapered portion 27D of the valve element 27 substantially in parallel is too large, resistance when the fluid flows increases, and it is also conceivable that a problem occurs in the flow control. To cope with this problem, since the axial length of the facing tapered portion 30D of the valve hole 31 is smaller than the axial length of the second needle tapered portion 27D, the increase in resistance when the fluid flows is suppressed while the valve element 27 (second needle tapered portion 27D) is brought into surface contact with the facing tapered portion 30D of the valve hole 31.

In addition, in a case where the taper angle of the second needle tapered portion 27D of the valve element 27 is equal to the taper angle of the facing tapered portion 30D of the valve hole 31, the contact area between the two is increased, and wear of the valve element 27 or the valve hole 31 is further suppressed. On the other hand, in a case where the taper angle of the facing tapered portion 30D is larger than the taper angle of the second needle tapered portion 27D, the valve element 27 is more likely to abut against the valve hole 31 on the smaller-diameter side (lower side) than on the larger-diameter side (upper side), so that the edge of the valve hole 31 (boundary portion between the flow control straight portion 30C and the upper tapered portion 30B) is less likely to be worn, and the flow control valve 10 can be used for a longer time.

Other Embodiments (1) In the above embodiment, the valve element 27 and the valve hole 31 have the needle straight portion 27C and the flow control straight portion 30C, but may not have these.

(2) In the above embodiment, the axial length of the facing tapered portion 30D of the valve hole 31 is smaller than the axial length of the second needle tapered portion 27D, but may be the same as or larger than the axial length of the second needle tapered portion 27D.

(3) In the above embodiment, the valve element 27 abuts on the valve seat 32 to close the valve. Alternatively, a configuration may be adopted in which, even in a state where the valve element 27 has entered most deeply into the valve hole 31, there is a clearance between the two to allow a minute amount of the fluid to flow.

Note that, although specific examples of the technology included in the claims are disclosed in the present specification and the drawings, the technology described in the claims is not limited to these specific examples, and includes those obtained by variously modifying and changing the specific examples, and also includes those obtained by singly extracting part of the specific examples. In addition, numerical values in the present specification are examples, and the technology described in the claims is not limited to these numerical values.

What is claimed is:

1. A flow control valve comprising:
a needle-shaped valve element fitted into a valve hole in a partition wall partitioning a flow path at an intermediate portion, wherein the valve element is configured to move in an axial direction of the valve element to control a flow rate of a fluid passing between an outer side surface of the valve element and an inner side surface of the valve hole;
a tapered inner side surface in the inner side surface of the valve hole; and
a tapered outer side surface in the outer side surface of the valve element, wherein
the tapered outer side surface faces the tapered inner side surface from inside, is inclined along the tapered inner side surface, and is parallel to the tapered inner side surface
the valve hole expands in diameter from the tapered inner side surface toward one end side, and expands in diameter from the tapered inner side surface toward another end side, and
the tapered inner side surface is smaller in axial length than the tapered outer side surface.

2. The flow control valve according to claim 1, wherein a distance the valve element moves is L1 [mm],
an increase in shortest distance between the tapered outer side surface and the tapered inner side surface is L2 [mm], and
$0 < L2/L1 < 0.18$.

3. The flow control valve according to claim 2, further comprising:
a stepping motor as a drive source,
wherein the valve element moves a distance of 0.5 to 20 [μm] for a working angle of one step of the stepping motor.

4. The flow control valve according to claim 3, wherein
an outer diameter of an end portion on a larger-diameter side of the tapered outer side surface is smaller than an inner diameter of an end portion on a larger-diameter side of the tapered inner side surface, and
a cylindrical outer side surface having an outer diameter equal to or larger than the outer diameter of the end portion on the larger-diameter side of the tapered outer side surface is adjacent to the end portion on the larger-diameter side of the tapered outer side surface in the outer side surface of the valve element.

5. The flow control valve according to claim 2, wherein
an outer diameter of an end portion on a larger-diameter side of the tapered outer side surface is smaller than an inner diameter of an end portion on a larger-diameter side of the tapered inner side surface, and
a cylindrical outer side surface having an outer diameter equal to or larger than the outer diameter of the end portion on the larger-diameter side of the tapered outer side surface is adjacent to the end portion on the larger-diameter side of the tapered outer side surface in the outer side surface of the valve element.

6. The flow control valve according to claim 1, wherein
an outer diameter of an end portion on a larger-diameter side of the tapered outer side surface is smaller than an inner diameter of an end portion on a larger-diameter side of the tapered inner side surface, and
a cylindrical outer side surface having an outer diameter equal to or larger than the outer diameter of the end portion on the larger-diameter side of the tapered outer side surface is adjacent to the end portion on the larger-diameter side of the tapered outer side surface in the outer side surface of the valve element.

7. The flow control valve according to claim 6, wherein
a cylindrical inner side surface having an inner diameter equal to or larger than the inner diameter of the end portion on the larger-diameter side of the tapered inner side surface and facing the tapered outer side surface from outside is adjacent to the end portion on the larger-diameter side of the tapered inner side surface in the inner side surface of the valve hole.

8. The flow control valve according to claim 1, further comprising:
abutting portions that are on a larger-diameter side relative to the tapered outer side surface of the valve element and the tapered inner side surface of the valve hole, and abut on each other to bring the flow control valve into a valve closed state,
wherein a gap is between the tapered outer side surface and the tapered inner side surface in the valve closed state.

9. A flow control valve comprising:
a needle-shaped valve element fitted into a valve hole in a partition wall partitioning a flow path at an intermediate portion, wherein the valve element is configured to move in an axial direction of the valve element to control a flow rate of a fluid passing between an outer side surface of the valve element and an inner side surface of the valve hole;
a tapered inner side surface in the inner side surface of the valve hole; and
a tapered outer side surface in the outer side surface of the valve element, wherein the tapered outer side surface faces the tapered inner side surface from inside, is inclined along the tapered inner side surface, and is parallel to the tapered inner side surface, an outer diameter of an end portion on a larger-diameter side of the tapered outer side surface is smaller than an inner diameter of an end portion on a larger-diameter side of the tapered inner side surface, a cylindrical outer side surface having an outer diameter equal to or larger than the outer diameter of the end portion on the larger-diameter side of the tapered outer side surface is adjacent to the end portion on the larger-diameter side of the tapered outer side surface in the outer side surface of the valve element, and a cylindrical inner side surface having an inner diameter equal to or larger than the inner diameter of the end portion on the larger-diameter side of the tapered inner side surface and facing the tapered outer side surface from outside is adjacent to the end portion on the larger-diameter side of the tapered inner side surface in the inner side surface of the valve hole.

10. A flow control valve comprising:

a needle-shaped valve element fitted into a valve hole in a partition wall partitioning a flow path at an intermediate portion, wherein the valve element is configured to move in an axial direction of the valve element to control a flow rate of a fluid passing between an outer side surface of the valve element and an inner side surface of the valve hole;

a tapered inner side surface in the inner side surface of the valve hole;

a tapered outer side surface in the outer side surface of the valve element, wherein the tapered outer side surface faces the tapered inner side surface from inside, is inclined along the tapered inner side surface, and is parallel to the tapered inner side surface; and abutting portions that are on a larger-diameter side relative to the tapered outer side surface of the valve element and the tapered inner side surface of the valve hole, and abut on each other to bring the flow control valve into a valve closed state, wherein a gap is between the tapered outer side surface and the tapered inner side surface in the valve closed state.

11. The flow control valve according to claim 10, wherein an outer diameter of an end portion on the larger-diameter side of the tapered outer side surface is smaller than an inner diameter of an end portion on a larger-diameter side of the tapered inner side surface, and a cylindrical outer side surface having an outer diameter equal to or larger than the outer diameter of the end portion on the larger-diameter side of the tapered outer side surface is adjacent to the end portion on the larger-diameter side of the tapered outer side surface in the outer side surface of the valve element.

* * * * *